Nov. 6, 1923. Re. 15,715

F. H. GLEASON

MEANS FOR LUBRICATING STEERING KNUCKLES AND OTHER PARTS OF VEHICLES

Original Filed Jan. 18, 1921

INVENTOR
F. H. Gleason
BY
Denison Thompson
ATTORNEYS.

Reissued Nov. 6, 1923. Re. 15,715

UNITED STATES PATENT OFFICE.

FREDERICK H. GLEASON, OF AUBURN, NEW YORK.

MEANS FOR LUBRICATING STEERING KNUCKLES AND OTHER PARTS OF VEHICLES.

Original No. 1,388,945, dated August 30, 1921, Serial No. 438,064, filed January 18, 1921. Application for reissue filed May 17, 1923. Serial No. 639,682.

*To all whom it may concern:*

Be it known that I, FREDERICK H. GLEASON, a citizen of the United States of America, and a resident of Auburn, in the county of Cayuga, State of New York, have invented certain new and useful Improvements in Means for Lubricating Steering Knuckles and Other Parts of Vehicles, of which the following is a specification.

The object of my invention is to provide means to lubricate the joints of knuckles of the steering wheels as well as the joints of the tie-rods between the knuckles of such wheels or the drag link joints or bearings, or other similar parts in automobiles or motor vehicles from a single supply of lubricant to each knuckle.

In accordance with a preferred embodiment of my invention, I provide the bolt of the steering knuckle with a bore to receive lubricant and passages from the bore to supply the bearings of the knuckle or the bolt and a conduit or conduits to be supplied with lubricant from the first-named bore, and in communication with the bearing of the tie-rod or of the drag link or similar part that is connected with an arm of the knuckle.

My invention also comprises novel details of improvement that will be more fully hereinafter set forth and then pointed out in the claims.

Reference is to be had to the accompanying drawings forming part hereof, wherein—

Similar numerals of reference indicate corresponding parts in the several views.

The numeral —1— indicates a portion of the front axle of an automobile or motor vehicle and —2— indicates the steering knuckle pivotally connected with said axle and provided with the shaft or spindle —3— for the wheel bearing, which parts may be of usual or suitable construction. In the form shown in Figure 1 the axle is provided with bearing $1^a$ receiving bolt —4—, which bolt is secured to said bearing as by means of a pin —5—, or in other desired manner, whereby the bolt is stationary and the forked or yoke-like portion $2^a$ of the steering knuckle receives the bearing $1^a$ and is journaled on bolt —4— to rotate relatively to the latter as sustained by the bearing $1^a$.

Figure 1:
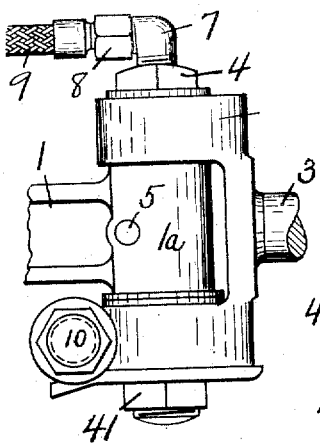
Figure 1 is a side view of a portion of a steering knuckle of an automobile or motor vehicle embodying my invention.
Figure 2:
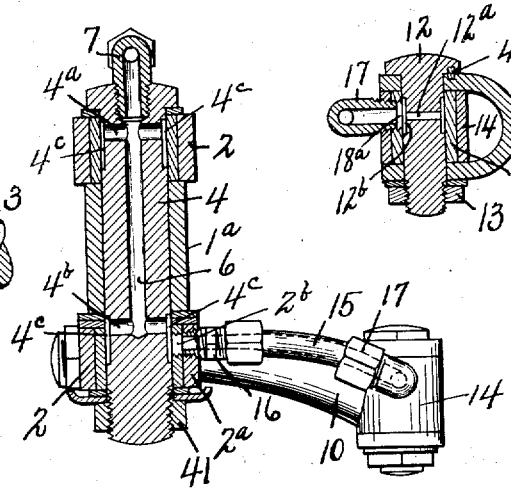
Figure 2 is a section on line 2—2 in Figure 1.
Figure 3:
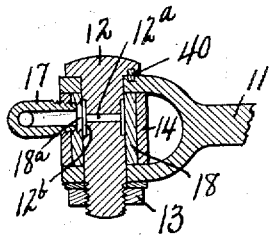
Figure 3 is a section on line 3—3 of Figure 2.
Figure 4:
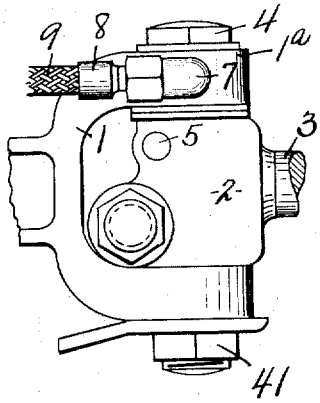
Figure 4 is a side view of a different form of steering knuckle embodying my invention.
Figure 5:
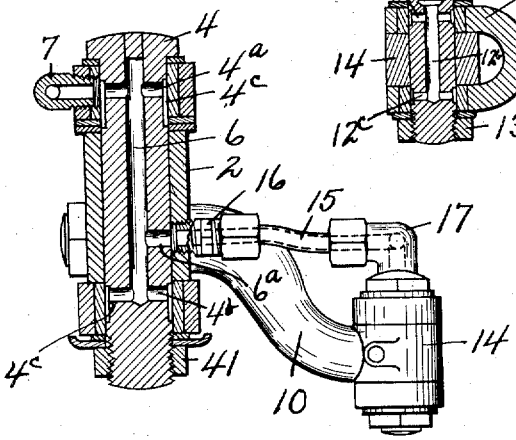
Figure 5 is a section on line 5—5 in Figure 4.

Bolt —4— is shown provided with a head at one end and with a nut $4^a$ at the other end on opposite sides of the yoke of the knuckle, in Figures 1 and 2, and correspondingly arranged with respect to the yoke or fork of the axle, as indicated in Figs. 4 and 5. Bolt —4— is provided with a longitudinal bore —6— to which a fitting —7— is attached, as shown in Figures 1 and 2, for a supply of lubricant from the fitting to said bore. Said fitting is shown in the form of an elbow connected by nut —8— to a flexible tube —9—, which may be connected to any suitable supply source of lubricant. Bolt —4— is provided with transverse passages $4^a$ for the upper bearing and transverse passages $4^b$ for the lower bearing, vertical grooves $4^c$ being provided in the bolt at said bearings to receive lubricant from passages $4^a$ and $4^b$. The arm —10— that projects from the steering knuckle for connection with the tie-rod or drag link —11— is provided with a bolt or pin —12— to connect said parts, which bolt or pin is shown provided with a head at one end and with a nut —13— at the other end in the usual manner. In the form shown in Figures 2 and 3 the bolt —12— is secured to tie-rod —11— by pin —40— so that the bolt rotates in the bearing at the end of arm —10—, whereas in Figures 5 and 6 the bolt —12— is free from the tie-rod and the latter rotates on bearing —14— relatively to said bolt.

An object of my invention is to convey lubricant from the bore of bolt —6— to the bearing of tie-rod —11— on arm —10—. In the form shown in Figures 1, 2 and 3, since the knuckle rotates relatively to the steering bolt —4—, I provide a conduit or tube —15— that connects the jaw $2^a$ of knuckle —2— to the bearing —14— of arm —10— so that all of said parts will move together. I have shown the lower jaw $2^a$ provided with a port $2^b$ communicating with a fitting —16— connected with the tube —15—, said tube being shown connected by fitting —17—, shown in the form of an elbow, with bearing —14— at which said fitting is attached. Bushing —18— in bearing —14— is provided with a port —18ᵃ— communicating with a transverse bore —12ᵃ— in bolt —12—, said bolt being shown provided with grooves 12ᵇ communicating with bore 12ᵃ to supply both sides of the bolt with lubricant.

Figure 6:
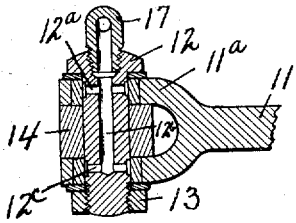
Figure 6 is a section on line 6—6 in Figure 5.

In the form shown in Figures 4, 5, 6 where bolt —4— rotates with knuckle —2— and is secured thereto by pin —5— and tie-rod —11— rotates upon pin —12—, the fitting —16— is attached to the knuckle —2— and communicates with a side bore 6ᵃ that communicates with bore —6— in bolt —4—, the fitting —17— being attached to bolt —12— at the top, the tube —15— connecting fittings —16— and —17—. Bolt —12— is shown provided with a longitudinal bore 12ᵇ communicating with fitting —17— and with transverse bores —12ᶜ— communicating with bore 12ᵇ and leading to the exterior of the bolt to supply the bearings at the fork or yoke 11ᵃ of the tie rod. In this construction, the bolt —12— rigidly carried by the arm —10— constitutes a portion of the bearing carried by said arm.

Since, in the last named figures, bolt 4 rotates with respect to the fork or yoke of axle —1— the fitting —7— that is connected with flexible tubing —9— is attached to the upper jaw 1ᵃ of said yoke or fork and communicates with bore 4ᵃ of bolt 4.

In accordance with my invention, lubricant may be supplied through tube —9— to bolt —4— from any suitable source, whether under pressure or by gravity, and such lubricant will not only lubricate bearings of the bolt, knuckle, and axle, but will be supplied through tube or conduit —15— to the bearings of the tie-rod, drag line or other bearing moving rigidly with the steering knuckle or equivalent part. Since the parts —15—, —16— and —17— move as a unit with arm —10— it will be apparent that in all positions of the knuckles the tie-rod bearings connected therewith will receive lubricant from bolt —4— so that it is only necessary to supply said bolt with lubricant to lubricate the bearings for the knuckle and the bearings for the tie-rod. Similar construction may be provided on each side of the vehicle.

While I have not set forth any particular means to supply lubricant to the bearings through tube —9—, the same may be supplied under pressure or by gravity by means set forth in my companion application filed herewith, wherein I have disclosed a lubricating system for an automobile chassis supplied with lubricant from the same pump that supplies the bearings of the motor of the vehicle under pressure.

Having now described my invention, what I claim is:—

1. The combination of an axle, a steering knuckle, a bolt pivotally connecting the same, an arm extending from the knuckle, a tie-rod, a bolt pivotally connecting the tie-rod and arm, means to supply the first named bolt with lubricant, and a conduit communicating with the bearings of the first and second named bolts to convey lubricant from the first named to the second named bolt.

2. The combination of an axle, a steering knuckle, a bolt pivotally connecting the same, an arm extending from the knuckle, a tie-rod, a bolt pivotally connecting the tie-rod and arm, said bolt having a bore and passages to supply lubricant to the bearings thereof, and a conduit communicating with said bore and with the bearings of the bolt of the tie-rod.

3. The combination of an axle, a steering knuckle, a bolt pivotally connecting the same, an arm extending from the knuckle, a tie-rod, a bolt pivotally connecting the tie-rod and arm, a fitting connected to one of the first-named parts, a fitting connected to one of the tie-rod parts, and a conduit connecting said fittings to supply lubricant from the first named bolt to the second named bolt.

4. The combination of an axle, a steering knuckle, a bolt pivotally connecting the same and provided with a bore communicating with its exterior, a supply fitting communicating with said bore, said knuckle having an arm, a tie-rod, a bolt pivotally connecting the arm and a tie-rod, a fitting communicating with said bolt, and a conduit connecting said fittings.

5. The combination of an axle, a steering knuckle, a bolt pivotally connecting the same and provided with a bore communicating with its exterior, a supply fitting connected to the bolt, and communicating with its bore, said knuckle having an arm, a tie-rod, a bolt pivotally connecting the arm and tie-rod, and a conduit communicating with the first and second named bolts.

6. The combination of an axle, a steering knuckle, a bolt pivotally connecting the same and provided with a bore communicating with its exterior, a supply fitting communicating with said bore, said knuckle having an arm, a tie-rod, a bolt pivotally connecting the arm and tie-rod, said arm having a fitting communicating with last-named bolt, and a conduit connecting said fittings.

7. In an apparatus of the class described, a steering knuckle bolt, rigidly connected upper and lower bearings for said bolt, an arm rigidly carried either by said bearing or by said bolt, a bearing carried by said arm, a single fitting connected to the upper end of said bolt and adapted to feed lubricant to the upper bearing for said bolt, to the lower bearing for said bolt and to the bearing carried by said arm.

8. In an apparatus of the class described, a steering knuckle bolt, rigidly connected upper and lower bearings for said bolt, an arm rigidly carried either by said bearing or by said bolt, a bearing carried by said arm, a single fitting connected either to said bolt or one of the rigidly connected bearings and adapted to feed lubricant to the upper bearing for said bolt, to the lower bearing for said bolt and to the bearing carried by said arm.

9. The combination with a shaft having a longitudinal passageway and a bearing for the shaft, of an arm extending from one of said elements and moving rigidly in unison with the element, a bearing carried by said arm, means for supplying lubricant to the shaft passageway, and means for conveying lubricant from the shaft passageway and supplying it to the bearing carried by said arm.

10. The combination with a shaft having a longitudinal passageway and a bearing for the shaft, of an arm extending from one of said elements and rigidly moving in unison with the element, a bearing carried by said arm and a single fitting connected to supply lubricant to the shaft passageway, to the bearing for the shaft and to the bearing carried by said arm.

11. The combination with a shaft and a bearing for the shaft of an arm extending from one of said elements and rigidly moving in unison with the element, a bearing carried by said arm, and a single fitting connected to supply lubricant to the bearing for the shaft and to the bearing carried by said arm.

12. The combination with a shaft having a longitudinal passageway and a bearing for the shaft, of an arm moving rigidly in unison with the shaft, a bearing carried by said arm, means for supplying lubricant to the shaft passageway, and means for conveying lubricant from the shaft passageway and supplying it to the bearing carried by said arm.

FRED H. GLEASON.

In the presence of—
H. E. Chase,
E. M. Fradenburgh